(12) United States Patent
Wear

(10) Patent No.: US 7,227,150 B2
(45) Date of Patent: Jun. 5, 2007

(54) SOLID-STATE X-RAY DETECTOR WITH SUPPORT MOUNTED STEERING ELECTRODES

(75) Inventor: James A. Wear, Madison, WI (US)

(73) Assignee: General Electric Co., Schenectady, NY (US)

( * ) Notice: Subject to any disclaimer, the term of this patent is extended or adjusted under 35 U.S.C. 154(b) by 265 days.

(21) Appl. No.: 10/838,891

(22) Filed: May 4, 2004

(65) Prior Publication Data

US 2005/0247880 A1    Nov. 10, 2005

(51) Int. Cl.
*G01T 1/24* (2006.01)
(52) U.S. Cl. ............................ 250/370.01
(58) Field of Classification Search ........... 250/370.01
See application file for complete search history.

(56) References Cited

U.S. PATENT DOCUMENTS

| 5,841,832 A | 11/1998 | Mazess et al. |
| 5,841,833 A | 11/1998 | Mazess et al. |
| 6,037,595 A | 3/2000 | Lingren |
| 6,521,894 B1* | 2/2003 | Iwanczyk et al. ...... 250/370.11 |
| 6,541,836 B2* | 4/2003 | Iwanczyk et al. ........... 257/429 |
| 2005/0167606 A1* | 8/2005 | Harrison et al. ....... 250/370.13 |

OTHER PUBLICATIONS

Kalemci et al., "Charge Splitting Among Anodes of CdZnTe Strip Detector," Nov. 2000, SPIE, pp. 1-8.*
Kalemci et al., "Investigation of Charge Sharing Among Electrode Strips for a CdZnTe Detector," Feb. 24, 2001, Nuclear Instruments and methods in Physics Research, pp. 527-537.*

* cited by examiner

*Primary Examiner*—David Porta
*Assistant Examiner*—Christine Sung

(57) ABSTRACT

Steering electrodes are used to improve the uniformity and efficiency of solid-state semiconductor x-ray detectors. The steering electrodes are insulated from the semiconductor material so as to prevent surface current flows that degrade the signal to noise ratio of the detected signal. A simple fabrication technique employing photolithographic techniques may be employed.

17 Claims, 2 Drawing Sheets

SOLID-STATE X-RAY DETECTOR WITH SUPPORT MOUNTED STEERING ELECTRODES

CROSS-REFERENCE TO RELATED APPLICATIONS

--

STATEMENT REGARDING FEDERALLY SPONSORED RESEARCH OR DEVELOPMENT

--

BACKGROUND OF THE INVENTION

The present invention relates generally to x-ray detectors, and in particular, to a solid-state semiconductor detector such as cadmium zinc telluride (CZT) used for quantitative x-ray imaging.

Measurements of the x-ray absorption by an object, for example, at two different x-ray energies, can reveal information about the composition of that object as decomposed into two selected basis materials. In the medical area, the selected basis materials are frequently bone and soft tissue. The ability to distinguish bone from soft tissue allows x-ray images to yield quantitative information about in vivo bone density for the diagnosis of osteoporosis and other bone disease.

Alternatively, the selection of other basis materials allows dual energy x-ray measurements to be used for the analysis of body composition by distinguishing between fat and non-fat tissue, or for baggage scanning by distinguishing between explosive and non-explosive materials.

High resistivity solid-state semiconductors such as cadmium zinc telluride (CZT) may be used to detect x-rays passing through a measured object in a single or dual energy x-ray system. In a planar-contact CZT detector, a voltage is imposed between an anode and cathode positioned on opposite faces of a CZT crystal. X-rays pass through the anode into the crystal to release electrons that are attracted to the cathode. The number of released electrons is proportional to the photon energy allowing high and low energy x-ray photons to be distinguished by pulse height.

Detectors of this design can exhibit a variation in the energy measurement dependent on the location of the x-ray radiation interaction within the crystal. This measurement variation results in a reduction in accuracy as well as poor energy resolution. The prior art has addressed this measurement variation by reducing the anode size and attaching "steering electrodes" to the crystal surrounding the anode. The steering electrodes are operated at an intermediate voltage between the voltages of the anode and cathode to shape the electrical field within the detector improving charge collection.

SUMMARY OF THE INVENTION

The finite resistance of the CZT crystal allows a surface current to flow between the steering electrode and the anode which presents a practical limit to the steering grid voltage above which energy measurement degradation begins to occur once again. The surface current is also believed to introduce noise into the detected signal.

Accordingly, the present invention places a thin layer of highly insulating material between the steering electrode and the CZT crystal preventing surface current flow. Manufacturing is simplified by placing the steering electrode on an insulating support holding the CZT crystal and placing the insulating layer on the steering electrode as attached to the insulating support. This approach also simplifies routing the electrodes for multi-electrode arrays.

The steering electrode's close proximity to the CZT crystal allows the electric field from the steering electrode to penetrate the CZT crystal, providing the necessary electron steering effect, while avoiding noise currents between the steering electrode and anode, and making it possible to increase the steering voltage significantly over what could otherwise be obtained using an electrode directly on or in the crystal.

DETAILED DESCRIPTION OF THE PREFERRED EMBODIMENT

Figure 1:
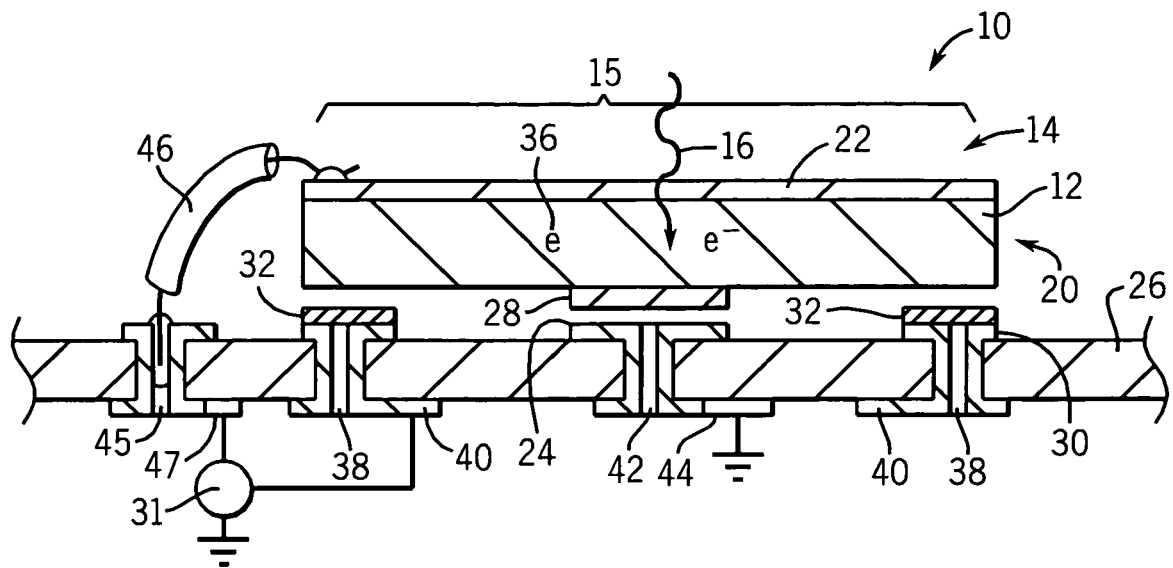
FIG. 1 is a side elevational cross section through an x-ray detector of the present invention having an insulating support and a CZT crystal and showing the associated cathode, anode, and steering electrodes, the latter being insulated from the CZT crystal.

Referring now to FIG. 1, a solid-state, dual energy x-ray detector system 10 may include a monolithic CZT crystal 12 having a front surface 14 normally facing a source of x-ray photons 16 and a rear surface 20 on the opposite side of the CZT crystal from the front surface.

A cathode 22 is applied to the front surface 14 of the CZT crystal 12, and an anode 24 is applied to the rear surface 20 of the CZT crystal 12 to provide a biasing electrical field between them. Generally, the cathode 22 will cover the entire front surface 14 but the anode will cover only a small area centered on the rear surface 20. Both the cathode 22 and anode 24 may be applied directly to the CZT crystal 12, for example, by sputtering, and are preferably formed of a conductive metal such as platinum. The front surface 14 of the CZT crystal 12 may also be protected by a light opaque, x-ray transparent material such as aluminized Mylar.

The CZT crystal 12 with attached cathode 22 and anode 24 may be supported at the rear surface 20 by an insulating support 26 abutting the rear surface 20. The gap between the insulating support 26 and rear face 20 is exaggerated in FIG. 1 to indicate how elements of insulation and electrodes are attached to the surfaces prior to assembly. The insulating support 26 holds on its front surface, facing the CZT crystal, an anode contact 28, flanked by steering electrodes 30 also held on the front surface of the insulating support.

When the CZT crystal 12 is placed against the insulating support 26, the anode contact 28 will align with and electrically connect to the anode 24. This connection may be enhanced through the use of a conductive epoxy or the like. In this configuration, the steering electrodes 30 will be proximate to the CZT crystal 12 but separated from the CZT crystal by an insulating layer 32 attached to the steering electrodes 30. Although a solid insulating layer 32 is shown, air insulation may also be used instead or in addition with the spacing of up to 0.2 millimeters. In the preferred embodiment, the dielectric constant of the insulating layer should be well matched to that of the solid-state material. In either case, direct electrical flow between the steering electrode 30 and the anode 24 may be avoided. On the other hand, it has been determined that the electrical field produced by the steering electrodes 30 will penetrate the CZT crystal and help steer electrons 36 generated by the interaction of the CZT crystal 12 and the x-ray photons 16 to the anode 24.

Placement of the steering electrodes 30 on the insulating support 26, rather than directly on the CZT crystal 12, greatly simplifies experimentation with different electrode configurations and allows a variety of electrode patterns to be used with single sets of CZT crystal 12 to achieve different product configurations.

The steering electrodes 30 on one side of the insulating support 26 may communicate via plate-through holes 38 with traces 40 on the opposite side of the insulating support 26, the latter which may conduct a steering voltage to the steering electrodes 30. Likewise, a plate-through hole 42 may allow communication between anode contact 28 and a grounding trace 44 providing grounding for the anode 24. An additional plate-through hole 45, displaced from the CZT crystal 12, allows a convenient attachment point of a high voltage lead 46 from the plate-through hole 45 to the cathode 22 to apply a biasing voltage to that cathode 22. The plate-through hole 45 also communicates with a trace 47 also on the opposite side of the insulating support 26 conducting a biasing voltage to the cathode 22.

These traces 40, 44, 47 may cross underneath different pixel regions 15 of the x-ray detector system 10, as will be described below, and by being thus removed from the CZT crystal 12 by the thickness of the insulating support 26 and possibly ground planes of that support, may have reduced effect on the electric fields and hence the operation of those different pixel regions 15. The insulating support 26 together with its electrodes 30, 28 and plate-through holes 38, 42 and 45 and traces, 44, 40 and 47 may be readily fabricated on a ceramic material such as alumina using standard photolithography techniques and sputtering of metallic layers, or by using standard printed circuit board techniques in which a metal-clad insulating material is etched to produce the necessary traces and treated to produce the plate through holes.

In operation of the x-ray detector system 10, the cathode 22 will be biased on the order of one thousand volts with respect to the ground of anode contact 28 to accelerate electrons 36 to the anode 24. The steering electrode 30 may be placed at a lower voltage, for example, one hundred volts to provide the necessary steering action. A power supply 31 will be connected to provide the necessary bias voltages. Outputs from the anode 24 may be connected to an amplifier to provide a signal to a processing computer to produce a quantitative image of the x-ray photons segregated by energy according to techniques well known in the art.

Figure 2:
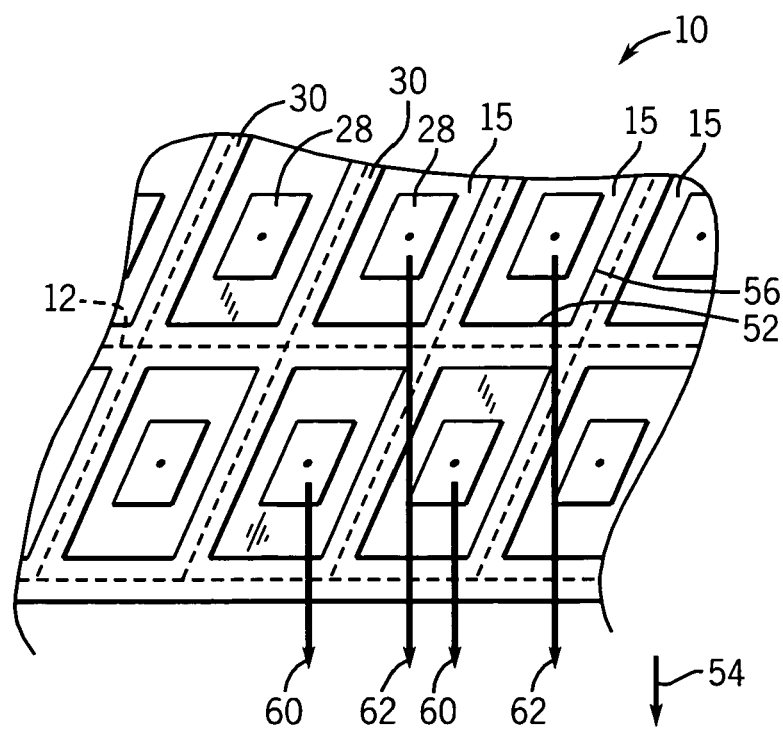
FIG. 2 is a top planar view of the insulating support showing the placement of the steering electrodes in a grid pattern and showing the location of the crystals and their anodes in a staggered parallelogram configuration for improved sampling in a scanning x-ray machine.

Referring now also to FIG. 2, generally the x-ray detector system 10 may provide for multiple detector elements on a single CZT crystal 12. In this case, multiple anodes 24 will be placed on the insulating support 26, each surrounded by steering electrodes 30.

The steering electrodes 30 surrounding each anode 24 (and equal area anode contact 28) describe by their perimeter a pixel region 15 associated with each anode contact 28. The pixel regions 15 describe areas which may independently detect x-ray photons 16 to produce a quantitative detection value that will be mapped to individual pixels in a resultant image.

In the embodiment shown in FIG. 2, the pixel regions 15 are generally parallelograms tiling in rows and slanted columns. In this embodiment, each parallelogram pixel region 15 has a first base 52 generally perpendicular to a scan direction 54 in which the x-ray detector system 10 will be scanned to collect information over an area of the patient. Sidewalls 56 of the parallelogram and the pixel regions 15 are angled such that the centers of the pixel regions 15 defined approximately by the center of the anode contact 28 for a first row of pixel regions 15, follow paths 60 that interleave with paths 62 followed by centers of the pixel regions 15 of a second row of pixel regions 15. In this way, larger pixel regions 15 may provide higher spatial resolution sampling to improve the resultant image.

Figure 3:
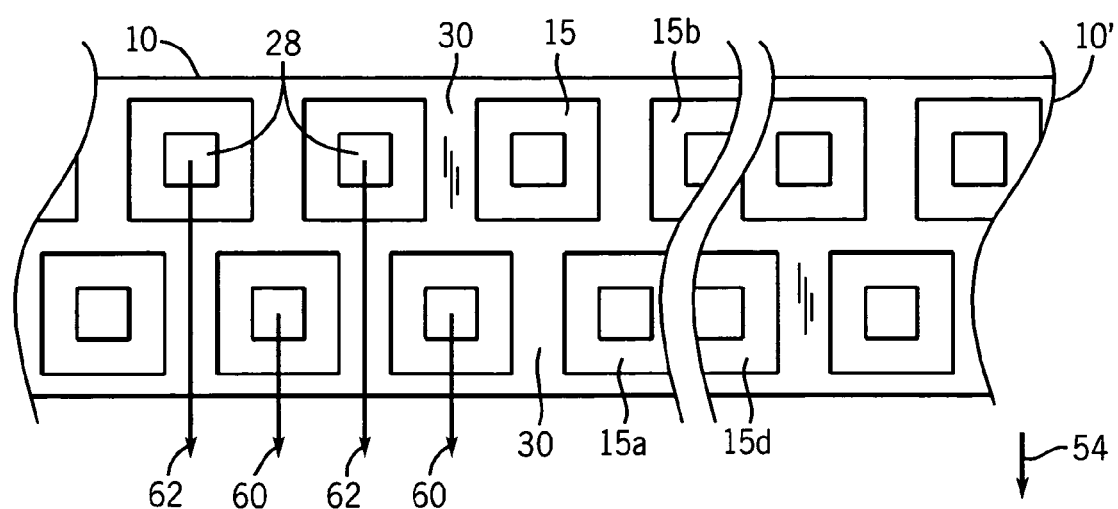
FIG. 3 is a figure similar to that of FIG. 2 showing an alternative staggered configuration of electrodes using rectangular detector elements.

Referring now to FIG. 3, in an alternative embodiment, the pixel regions 15 may be rectangular with the pixel regions 15 of a first row staggered with respect to the second row to provide interleaved paths 60 and 62 as before. The rectangular pixel regions 15 of FIG. 3 provide the advantage of a more compact detection region limiting the effective size of a convolution kernel (a function of the project width of the pixel regions 15 on a line perpendicular to the scan direction 54) that can make a resultant image less distinct.

Referring still to FIG. 3, a convenient form factor for the x-ray detector system 10 has two rows each having eight pixel regions 15. Multiple detector systems 10 of this or similar form factors may be ganged edgewise to provide arbitrary continuations of the rows. For an x-ray detector system 10 having rectangular pixel regions 15, pixel regions 15a and 15b at a first and second row of a right edge of the x-ray detector system 10 may be cut at an angle with respect to the scan direction 54 to equally reduce the area of the pixel regions 15a and 15b. Similarly reduced pixel regions 15c and 15d at a first and second row of a left edge of a next x-ray detector system 10' may be placed in close proximity to their counterpart pixel regions 15b and 15a. The area of each pixel region 15a–15d is reduced by half the width of the joint gap between x-ray detector system 10 and 10', which then preserves the regular lateral of the other pixel regions 15. In another embodiment, the area of each pixel region 15a–15d is reduced to slightly less than half to accommodate the joint gap between x-ray detector system 10 and 10'. This provides two virtual pixel regions, the first being a combination of the signals from pixel regions 15a and 15d, and the second being a combination of the pixel regions 15b and 15c. The slightly reduced detection area of these detectors virtual pixel regions may be corrected mathematically by a weighting factor applied by the computer receiving the signals.

It is specifically intended that the present invention not be limited to the embodiments and illustrations contained herein, but include modified forms of those embodiments including portions of the embodiments and combinations of elements of different embodiments as come within the scope of the following claims.

I claim:

1. A solid-state x-ray detector comprising:
    a semiconductor material having a first face supporting a biasing electrode and adapted to receive x-ray energy and a second face opposite the first face supporting a collecting electrode;
    an insulating support formed separately from the semiconductor material and positionable adjacent to the second face of the semiconductor material;

at least one steering electrode attached to the insulating support; and an insulating layer positioned between the insulating support and the second face of the semiconductor material when the insulating support is adjacent to the second face of the semiconductor material.

2. The solid-state x-ray detector of claim 1 wherein the insulating layer includes a solid insulator.

3. The solid-state x-ray detector of claim 1 wherein the insulating layer includes an air gap.

4. The solid-state x-ray detector of claim 1 wherein the collecting electrode has steering electrodes flanking it on at least two sides.

5. The solid-state x-ray detector of claim 1 wherein the collecting electrode has steering electrodes describing a closed perimeter about the collecting electrode.

6. The solid-state x-ray detector of claim 1 further including a power supply applying a first voltage across the collecting electrode and biasing electrode to draw electrons produced by x-rays striking the semiconductor material to collecting electrode and applying a second voltage between the collecting electrode and the steering electrode to steer electrons toward the collecting electrode.

7. The solid-state x-ray detector of claim 6 wherein the first voltage is greater than the second voltage.

8. The solid-state x-ray detector of claim 1 wherein the support supports multiple collecting electrodes separated by steering electrodes to divide the semiconductor material into independent detection zones.

9. The solid-state x-ray detector of claim 1 wherein the insulating support also provides conductive traces on a side of the insulating support removed from the semiconductor material and communicating with conductors on the side of the insulating support adjacent to the semiconductor material by conductive vias.

10. The solid-state x-ray detector of claim 1 wherein the insulating support is a ceramic material.

11. The solid-state x-ray detector of claim 1 wherein the semiconductor is CZT.

12. A method of manufacturing a solid-state x-ray detector comprising:

applying a biasing electrode on a first face of a semiconductor material for receiving x-ray energy;

applying a collecting electrode in a second face of the semiconductor material opposite the first face;

applying at least one steering electrode to a first face of an insulating support that is separate from the semiconductor material; and abutting the first face of the insulating support against the second face of the semiconductor material, such that the at least one steering electrode is adjacent to the second face of the semiconductor material.

13. The method of claim 12 further including the step of positioning an insulator between the semiconductor material and the steering electrode.

14. The method of claim 12 further including the step of attaching a power supply applying a first voltage across the collecting electrode and biasing electrode to draw electrons produced by x-rays striking the semiconductor to the collecting electrode and applying a second voltage between the collecting electrode and the steering electrode to steer electrons toward the collecting electrode.

15. The method of claim 12 wherein the support supports multiple collecting electrodes separated by steering electrodes to divide the semiconductor material into independent detection zones.

16. The method of claim 12 wherein the insulating support includes vias communicating from the steering electrode on a first side of the support to traces on a second side of the support and including the step of manufacturing the vias using plated through holes.

17. The method of claim 12 wherein the insulating support if manufactured by applying conductive materials to a ceramic support.

* * * * *